Oct. 13, 1936.  S. W. E. ANDERSSON ET AL  2,057,408

COOLING ELEMENT FOR REFRIGERATING SYSTEMS

Filed Dec. 2, 1932  3 Sheets-Sheet 1

INVENTORS.
Sven W. E. Andersson
William R. Hainsworth
BY
ATTORNEY.

Patented Oct. 13, 1936

2,057,408

UNITED STATES PATENT OFFICE 2,057,408

COOLING ELEMENT FOR REFRIGERATING SYSTEMS

Sven W. E. Andersson, New York, and William R. Hainsworth, Larchmont, N. Y., assignors, by mesne assignments, to Servel, Inc., Dover, Del., a corporation of Delaware Application December 2, 1932, Serial No. 645,422

13 Claims. (Cl. 62—126)

Our invention relates to refrigeration and more particularly to a new and improved cooling element for a system which produces refrigeration by the evaporation of liquid cooling fluid by diffusion into an inert auxiliary gas.

A refrigerating system of this type is disclosed in Patent No. 1,609,334 to von Platen et al. Briefly, there is usually provided an evaporator comprising a closed vessel having vertically spaced liquid spreading baffles and interconnected with an absorber, comprising a somewhat similar structure, for the circulation of an inert gas such as hydrogen. Liquid cooling fluid such as ammonia is conducted into the upper part of the evaporator from where it flows downwardly over the baffle plates, evaporating by diffusion into the hydrogen. The resulting gas mixture flows into the absorber where an absorption liquid such as water flowing downwardly over the baffle plates absorbs the ammonia out of the gas mixture. The hydrogen or "weak" gas is returned from the absorber to the evaporator and the enriched absorption solution is conducted to a generator where the ammonia is expelled from solution by heat, the ammonia vapor being rectified for removal of water vapor and condensed to liquid which is again conducted to the evaporator.

In Patent No. 1,729,625 to Carl G. Munters there is disclosed an evaporator for this type of refrigerating system comprising a pipe coil in place of the usual evaporator vessel. Inert gas is circulated through this coil and liquid cooling fluid introduced into the upper end thereof, the coil being provided with means for retaining the descending liquid in a series of pools therein.

In accordance with our invention there is provided a cooling element generally of the type disclosed in the above mentioned Patent No. 1,729,625 but embodying an improved coil formation in conjunction with a freezing compartment which results in a compact cooling element in which there is downward flow of liquid in a continuous path and in which the spacing of containers for substance to be frozen, such as ice trays, is not dependent upon the dimensions of the coil or spacing of the turns. We also provide improved means for increasing the surface of the liquid cooling fluid in the coil.

Figure 1:
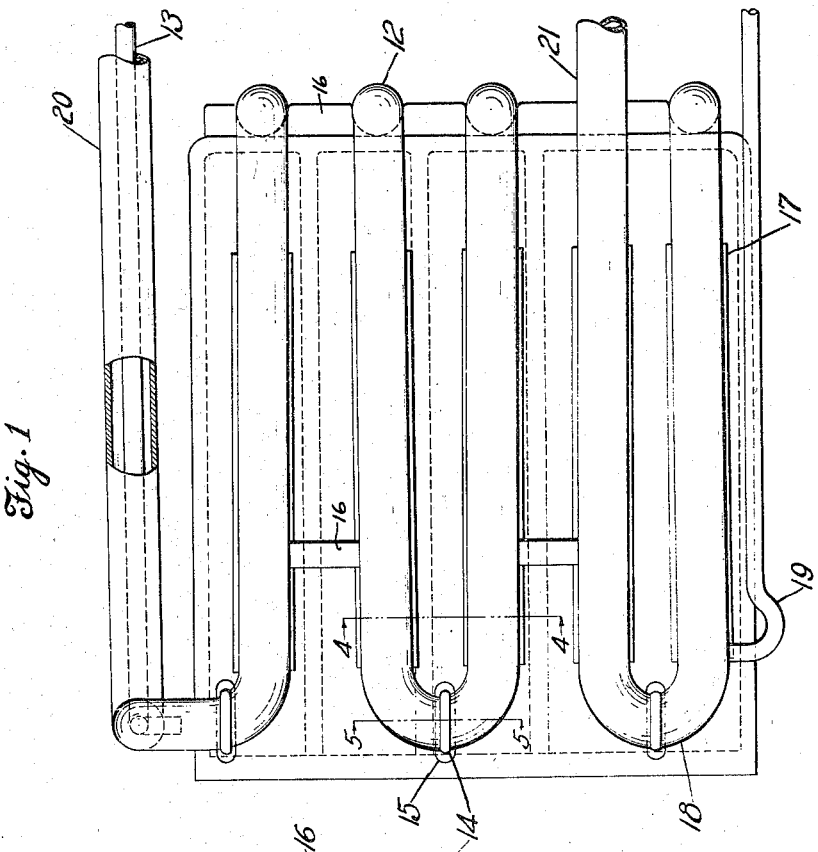
Figure 2:
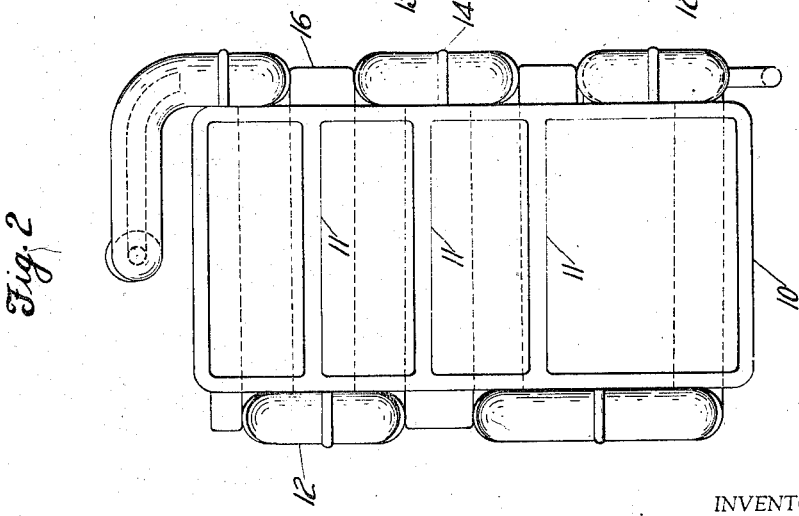
Figure 4:
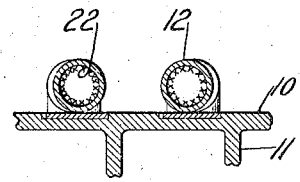
Figure 5:
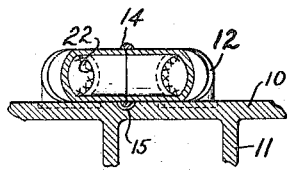
Figure 3:
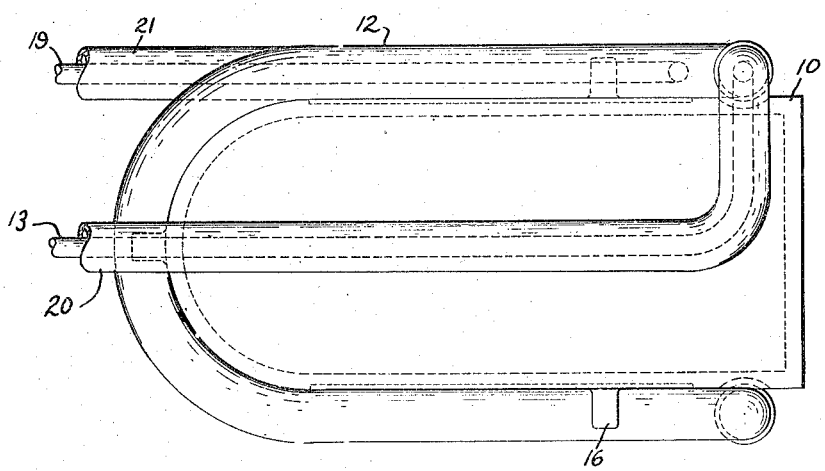

Other objects and advantages will be apparent from the following description taken in conjunction with the accompanying drawings, in which, Fig. 1 is a side elevation of an evaporator or cooling element contemplated by our invention;

Fig. 2, a front end view of the cooling element shown in Fig. 1;

Fig. 3, a plan view of the cooling element shown in Figs. 1 and 2;

Fig. 4, a detail section taken on line 4—4 in Fig. 1;

Fig. 5, a detail section taken on line 5—5 in Fig. 1; and

Figure 6:
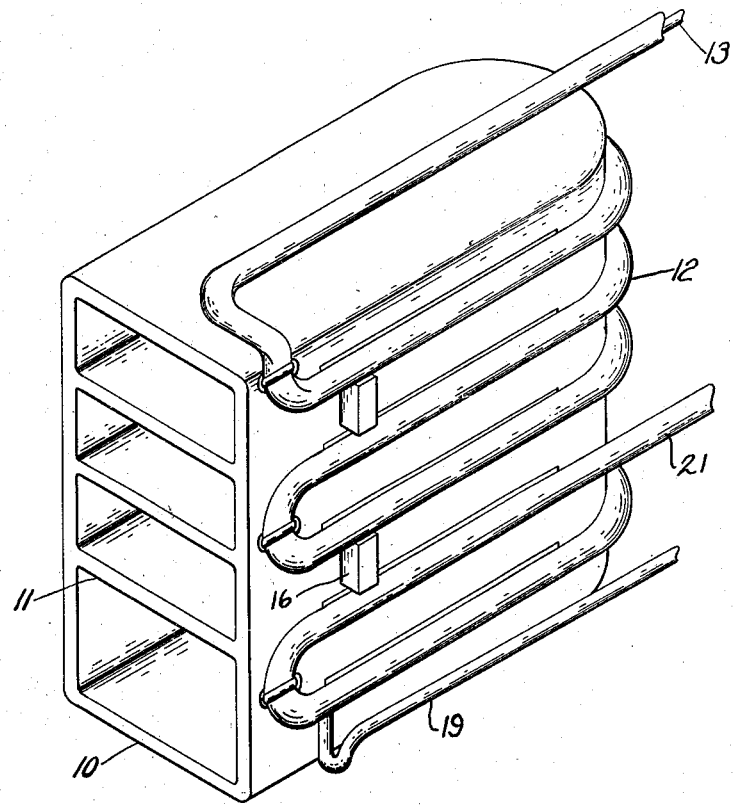

Fig. 6, an isometric view of the cooling element.

Referring to the drawings, a receptacle 10 open at the front end and tray supports or shelves 11 are preferably formed by an integral casting of good thermal conductive material such as aluminum. Around the closed sides of the receptacle 10 is located a pipe coil 12 having a plurality of substantially horizontal superposed U-shaped turns between which are vertical reverse turns on each side of the receptacle. As may be seen best in Fig. 2 the coil 12 has a constantly downward slant which is very slight along the horizontal turns and of course acute on the vertical turns, so that liquid cooling fluid introduced at the upper end of the coil through conduit 13 will have a continuously downward flow therethrough.

As shown in Fig. 4, the leg portions of the U-bends along the sides of the receptacle 10 are lined with a wick-like material 22 which, when the cooling liquid used is ammonia, is preferably steel gauze or the like. To facilitate construction of the coil and insertion of the steel gauze cylinders, the coil may be conveniently fabricated of individual U-sections and the ends turned up and down after the gauze has been inserted in the leg portions. The several loops are assembled by welding together at their ends as at 14 in Figs. 1 and 2. In the welding process, material is built up around the joint wherefore, in order that the coil will lie flat against the receptacle 10, the latter is provided with grooves 15 as shown in Figs. 1 and 5 to receive the projections at the joints. Lugs or bosses 16 cast integrally with the casing may be provided for correctly locating the coil with respect to the receptacle 10.

When ammonia is used as the cooling liquid, the pipe coil 12 is preferably made of steel and, in order to adequately secure the coil to the receptacle mechanically and thermally, strips 17 of copper or equivalent material are cast as inserts in the surface of the receptacle 10, and the leg portions of the coil lying alongside thereof are readily secured to the strips 17 by soldering or brazing.

The lower end of the pipe coil 12 has an upward reverse loop 18 and extends rearwardly between the two lower horizontal U-bends for connection to a suitable refrigerating system. A liquid drain conduit 19 is connected to the lower end of the coil 12 for draining unevaporated cooling liquid at high inputs.

In operation, inert gas such as hydrogen is circulated through the coil 12 from a suitable refrigerating system, connections to which are made at the ends 20 and 21 of the coil. Liquid cooling fluid such as ammonia is introduced into the upper end of the coil through conduit 13, and flows downwardly in the coil due to the continuously downward slant of the coil turns. The descending liquid is retained in finely divided form over the interior surface of the coil by the capillary steel mesh linings 22 thereby presenting an extensive surface area which facilitates evaporation of the liquid by diffusion into the inert gas.

With the above described coil arrangement comprising superposed U-shaped turns there is outlined a freezing chamber entirely unobstructed at one end whereby ice trays of any depth and in any desired spaced relation may be inserted and withdrawn independently of the dimensions or spacing of the coil turns. Furthermore, any desired tray support for conducting heat from the tray to the coil may be utilized because the freezing chamber is completely accessible from the open end. For instance, excellent heat conductivity from tray to coil can be obtained by casting the aluminum receptacle 10 and its shelves 11 around the coil 12 as an insert, or the coil 12 could be formed by the rolled edges of superposed sheet metal shelves connected by vertical conduits. At the same time, with this arrangement, the continuously downward slant of the coil allows gravity flow therethrough of the liquid cooling fluid which is desirable in a cooling element for a refrigerating system of the pressure equalized type.

It will be obvious to those skilled in the art that various other changes may be made in the construction and arrangement without departing from the spirit of the invention and therefore the invention is not limited to what is shown in the drawings and described in the specification but only as indicated in the following claims.

We claim:
1. A cooling element comprising a conduit adapted for circulation of inert gas and continuously downward flow of liquid therethrough, said conduit having a plurality of superposed U-shaped turns, means within said conduit for retaining liquid in a manner to present extensive surface area of the liquid to the gas, and a connection for liquid cooling fluid to the upper part of said conduit.

2. A cooling element comprising a pipe coil adapted for circulation of inert gas and continuously downward flow of liquid therethrough, said coil having alternate substantially horizontal and vertical U-shaped turns, means within said coil for retaining liquid in a manner to present extensive surface area of the liquid to the gas, and a connection for liquid cooling fluid to the upper part of said coil.

3. A cooling element comprising a pipe coil adapted for circulation of inert gas and continuously downward flow of liquid therethrough, said coil having alternate substantially horizontal and vertical U-shaped turns, wick-like members within said coil for retaining liquid in finely divided form over an extensive surface, and a connection for liquid cooling fluid to the upper part of said coil.

4. A cooling element comprising a pipe coil adapted for circulation of inert gas and continuously downward flow of liquid therethrough, said coil having a plurality of substantially horizontal superposed U-shaped turns, a lining of wick-like material in the leg portions of said turns, and a connection for liquid cooling fluid to the upper part of said coil.

5. A cooling element comprising a pipe coil adapted for circulation of inert gas and continuously downward flow of liquid therethrough, said coil having alternate substantially horizontal and vertical U-shaped turns, means within said coil for retaining liquid in a manner to present extensive surface area of the liquid to the gas, a connection for liquid cooling fluid to the upper part of said coil, and a heat conducting support for objects to be cooled arranged in thermal conductive relation with said coil.

6. A cooling element comprising an open front chamber formed by a casing of heat conducting material, a pipe coil adapted for circulation of inert gas and continuously downward flow of liquid therethrough, said coil having a plurality of vertically spaced horizontally disposed U-shaped turns in thermal conductive relation with the closed sides of the casing, means within said coil for retaining liquid in a manner to present extensive surface area of the liquid to the gas, and a connection for liquid cooling fluid to the upper part of said coil.

7. A cooling element comprising an aluminum casting forming a plurality of superposed chambers open at the same end, a steel pipe coil adapted for circulation of inert gas and continuously downward flow of liquid therethrough, said coil having a plurality of substantially horizontal superposed U-shaped turns around the closed sides of said casting, a plurality of copper strip inserts in said casting to which are soldered the leg portions of said turns, cylinders of steel mesh lining the leg portions of said turns, and a connection for liquid cooling fluid to the upper part of said coil.

8. A cooling element comprising an aluminum casting forming a chamber open at one end and supporting means in said chamber for containers of substance to be cooled, a pipe coil adapted for circulation of inert gas and continuously downward flow of liquid therethrough, said coil having a plurality of U-shaped turns around the closed sides of said casting, a wick-like lining in said coil for distribution of liquid over the surface thereof by capillarity, and a connection for liquid cooling fluid to the upper end of said coil.

9. A cooling element comprising a substantially rectangular aluminum casting forming a chamber open at one end, a steel pipe coil adapted for circulation of inert gas and continuously downward flow of liquid therethrough, said coil comprising superposed U-shaped turns around the closed sides of said casting, copper strip inserts in the surface of said casting to which are secured the leg portions of said turns, lining of steel mesh in said coil for distributing liquid on the inner surface thereof by capillarity, and a connection for liquid cooling fluid to the upper part of said coil.

10. A cooling element comprising a pipe coil adapted for circulation of inert gas and continuously downward flow of liquid therethrough, means within said coil for raising liquid in finely divided form over an extensive surface in contact with the gas, and a connection for liquid cooling fluid to the upper part of said pipe coil.

11. A cooling element comprising a pipe coil adapted for circulation of inert gas and continuously downward flow of liquid therethrough, a wick within said coil for raising liquid in finely divided form over an extensive surface in contact with the gas, and a connection for liquid cooling fluid to the upper part of said coil.

12. A cooling element comprising an open front chamber formed by a casing of heat conducting material, a pipe coil adapted for circulation of inert gas and continuous downward flow of liquid therethrough arranged on only closed sides of said casing in thermal conductive relation therewith, means within said coil for raising liquid above its location therein due to gravity in a manner to present extensive surface area of the liquid to the gas, and a connection for liquid cooling fluid to the upper part of said coil.

13. An evaporator comprising a conduit of relatively small cross-sectional area relative to its length and of such cross-sectional area as to permit flow of a stream of liquid refrigerant along the bottom of the conduit occupying less than the full cross-sectional area and adapted for flow of an inert gas through the conduit above the stream of liquid, and capillary means for raising liquid flowing in the lower portion of the conduit into extensive surface contact with the gas in the upper portion of said conduit.

SVEN W. E. ANDERSSON.
WILLIAM R. HAINSWORTH.